United States Patent
Schiffler et al.

(10) Patent No.: US 10,077,809 B2
(45) Date of Patent: Sep. 18, 2018

(54) ROLLING BEARING COMPRISING AN ELECTRIC CIRCUIT, AND METHOD FOR PRODUCING AN ELECTRIC CIRCUIT FOR A ROLLING BEARING

(71) Applicant: Schaeffler Technologies AG & Co. KG, Herzogenaurach (DE)

(72) Inventors: Andreas Schiffler, Herzogenaurach (DE); Jurgen Gierl, Erlangen (DE); Jens Heim, Bergrheinfeld (DE)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/509,068

(22) PCT Filed: Jun. 16, 2015

(86) PCT No.: PCT/DE2015/200369
§ 371 (c)(1),
(2) Date: Mar. 6, 2017

(87) PCT Pub. No.: WO2016/034174
PCT Pub. Date: Mar. 10, 2016

(65) Prior Publication Data
US 2017/0261037 A1    Sep. 14, 2017

(30) Foreign Application Priority Data

Sep. 5, 2014 (DE) .................. 10 2014 217 787

(51) Int. Cl.
*F16C 41/00* (2006.01)
*F16C 19/26* (2006.01)

(52) U.S. Cl.
CPC ............ *F16C 41/002* (2013.01); *F16C 19/26* (2013.01); *F16C 2202/30* (2013.01)

(58) Field of Classification Search
CPC .......................... F16C 41/02; F16C 2202/30
See application file for complete search history.

(56) References Cited

U.S. PATENT DOCUMENTS 5,585,577 A    12/1996  Lemoine et al.
7,523,670 B2*  4/2009   Meyer ................. G01L 5/0014
                                                    384/448

(Continued)

FOREIGN PATENT DOCUMENTS

CN    102066787 A    5/2011
DE    102010004853   7/2011
WO    9707585        2/1997

*Primary Examiner* — Thomas R Hannon
(74) *Attorney, Agent, or Firm* — Volpe and Koenig, P.C.

(57) ABSTRACT

A rolling bearing with an electrical circuit is disclosed. The rolling bearing includes a first electrically insulating layer, at least one second electrically insulating layer deposited directly on at least one surface section of the rolling bearing, a first electrically conductive layer provided over the first electrically insulating layer, conductor paths with contact positions adapted for electrical contacting of electrical components, and at least one second electrically conductive layer. The at least one second electrically conductive layer is structured and supported on the at least one second electrically insulating layer. The first electrically insulating layer and the first electrically conductive layer with the conductor paths and the contact positions are deposited on the at least one second electrically conductive layer.

7 Claims, 2 Drawing Sheets

(56) References Cited

U.S. PATENT DOCUMENTS

| | | | |
|---|---|---|---|
| 7,568,842 B2* | 8/2009 | Gempper | F16C 19/522 |
| | | | 384/448 |
| 7,591,194 B2* | 9/2009 | Pecher | F16C 41/00 |
| | | | 73/862.322 |
| 9,175,726 B2 | 11/2015 | Beresch et al. | |
| 9,574,604 B2* | 2/2017 | Heim | G01L 5/0009 |
| 2002/0054719 A1 | 5/2002 | Takizawa et al. | |
| 2010/0074567 A1 | 3/2010 | Giordana | |

* cited by examiner

ROLLING BEARING COMPRISING AN ELECTRIC CIRCUIT, AND METHOD FOR PRODUCING AN ELECTRIC CIRCUIT FOR A ROLLING BEARING

BACKGROUND

The present invention relates to a rolling bearing with an electrical circuit.

The invention further relates to a manufacturing process of an electrical circuit on at least one surface section of a rolling bearing.

In general, circuit carriers with an electrical metal core are primarily used for electrical circuits, as sufficiently disclosed in the prior art.

Such circuit carriers are used in various fields, also for rolling bearings as described, for example, in the U.S. Published Application US 2002/054,719 A1. A disadvantage, however, is that previously known circuit carriers require a lot of installation space in the rolling bearing.

SUMMARY

One object of the current invention is therefore to provide a cost-effective rolling bearing with an electrical circuit in which the electrical circuit uses minimal installation space in or on the rolling bearing and is simultaneously protected from environmental effects during operation.

This objective is achieved by a rolling bearing with an electrical circuit that comprises the features of the invention.

Another object of the current invention is to provide a cost-effective manufacturing method of an electrical circuit on at least one surface section of a rolling bearing in which the electrical circuit uses minimal installation space in or on the rolling bearing. Simultaneously, the electrical circuit is protected from environmental effects during operation of the rolling bearing.

This object is achieved by a manufacturing method of an electrical circuit for a rolling bearing that comprises the features of the invention.

In the rolling bearing according to the invention with an electrical circuit, according to the invention a first electrically insulating layer is deposited directly on at least one surface section of the rolling bearing. A first electrically conductive layer that forms multiple conductor paths with contact positions for the electrical contacting of electrical components is provided over the first electrically insulating layer. Here it is essential that the surface section of the rolling bearing is on an electrically conductive material. The surface section of the rolling bearing and thus all of the layers formed on top can therefore be constructed arbitrarily in three-dimensional space. It is also to be noted that both layers deposited on the rolling bearing can be deposited by any coating method known from the prior art.

In a first embodiment of the invention, the electrical components are passive electrical components. Another embodiment of the rolling bearing according to the invention likewise provides that the electrical components are electronic components. In a preferred embodiment of the invention, however, both the passive electrical components and also the electronic components are provided as electrical components that are mounted and contacted at the contact positions all together according to the methods known from the prior art.

Another preferred embodiment of the rolling bearing according to the invention provides that the first electrically insulating layer is structured in at least one position up to the surface section of the rolling bearing. In this at least one position, an electrical contacting element is then formed so that the electrically conductive layer is connected to the rolling bearing in an electrically conductive manner.

In another preferred embodiment of the invention, at least one second electrically insulating layer is deposited directly on the at least one surface section of the rolling bearing that supports at least a second electrically conductive and structured layer. The first electrically insulating layer and the first electrically conductive layer with the conductor paths and the contact positions are then deposited on this at least one second electrically conductive and structured layer. Thus, multiple levels of layers (multilayer) are possible. The at least one second electrically insulating layer and the at least one second electrically conductive and structured layer together with the rolling bearing then always correspond to a thin-film sensor system. Thus, the at least one second electrically insulating layer fulfills a protective function of the at least one second electrically conductive and structured layer against particles and fluids.

Preferably, in another embodiment of the invention it is then provided that the first electrically insulating layer is structured in at least one position up to a surface section of the at least second electrically conductive layer. In this at least one position, at least one electrical contact is provided that connects the at least second electrically conductive layer to at least one electrical conductor path or a contact position of the first conductive layer. For the electrical contacting, any method for producing the electrical connection can be used. In particular, this is realized by the use of an electrical adhesive polymer metal compound, for example, a conductive adhesive.

The production method according to the invention for an electrical circuit on at least one surface section of a rolling bearing is characterized by the following steps: In a first step, a first electrically insulating layer is formed on the surface section of the roller bearing. Then a first electrically conductive layer is formed on the first electrically insulating layer. Another processing step provides that the first electrically conductive layer is structured so that conductor paths are formed in the first electrically conductive layer. Finally, contact positions are then formed on the conductor paths.

Preferably, in the production method according to the invention, the first electrically insulating layer and the first electrically conductive layer are formed by means of an electrostatic powder coating method, wherein, however, other coating methods known from the prior art can also be used.

A preferred embodiment of the production method according to the invention provides that, before the formation of the first electrically insulating layer and the first electrically conductive layer on at least one surface section of the roller bearing, at least one second electrically insulating layer is formed on which an at least second electrically conductive and structured layer is provided. Advantages of an electrical circuit formed by this production method have already been described with respect to the roller bearing, so that the created protective function with respect to environmental effects, such as particles, fluids, etc., will not be discussed again here.

Another preferred embodiment of the production method is realized such that the first electrically insulating layer is structured in at least one position up to a surface section of the at least second electrically conductive layer, so that at least one electrical contact is provided by which the at least second electrically conductive layer is connected to at least one electrical conductor path or a contact position of the first conductive layer.

It is further provided that passive electrical components and/or electronic components can be mounted according to known methods and processes from the prior art over the contact positions of the conductor paths of the first conductive layer. These methods can also be applied accordingly for the contacts.

Through the layers to be deposited directly on the roller bearing, the electrical circuit formed in this way according to the invention saves installation space in and/or on the roller bearing. With respect to the prior art, a separate circuit carrier can be eliminated. This has the advantage that a safe and permanent connection of the circuit and the roller bearing is given via the layers on at least one surface section. Furthermore, because individual processing steps for creating electrical circuits according to the invention are known, these can be performed economically, so that this also has beneficial effects on costs for the invention. Multiple layers to be deposited on the roller bearing also make it possible for a protective function to be created for surfaces used to sense environmental effects by means of the invention.

BRIEF DESCRIPTION OF THE DRAWINGS

Below, embodiments of the invention and their advantages with respect to the accompanying figures will be explained in more detail. The size relationships in the figures do not always correspond to the real size relationships, because some shapes are simplified and other shapes are shown enlarged with respect to other elements for better clarity. Shown herein are.

DETAILED DESCRIPTION OF THE PREFERRED EMBODIMENTS

For elements in the invention that are identical or have identical actions, identical reference symbols will be used. Furthermore, for the sake of clarity, only reference symbols that are required for the description of the respective figure are shown in the individual figures. The shown embodiments merely represent examples how the roller bearing with an electrical circuit according to the invention and the production method for an electrical circuit for a roller bearing according to the invention could be configured and thus do not exclusively restrict the invention.

Figure 1:
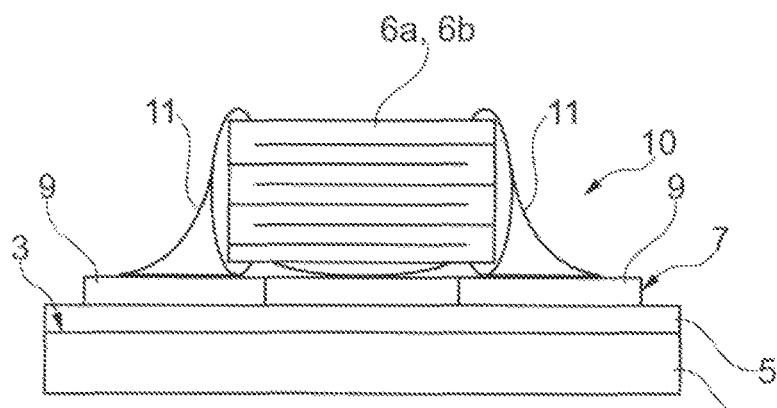
FIG. 1 a schematic side view of a part of a first embodiment of the roller bearing according to the invention with an electrical circuit, FIG. 2 a schematic side view of a part of the roller bearing with another embodiment of an electrical circuit connected to the roller bearing, FIG. 3 a perspective view of a roller bearing with an electrical circuit produced on a surface section of the roller bearing, FIG. 4 a schematic side view of a part of the roller bearing with another embodiment of an electrical circuit connected to the roller bearing, and FIG. 5 an enlarged detail section of the area marked with D in FIG. 4.

FIG. 1 shows a schematic side view of a part of a first embodiment of the roller bearing 1 according to the invention with an electrical circuit 10.

Figure 3:
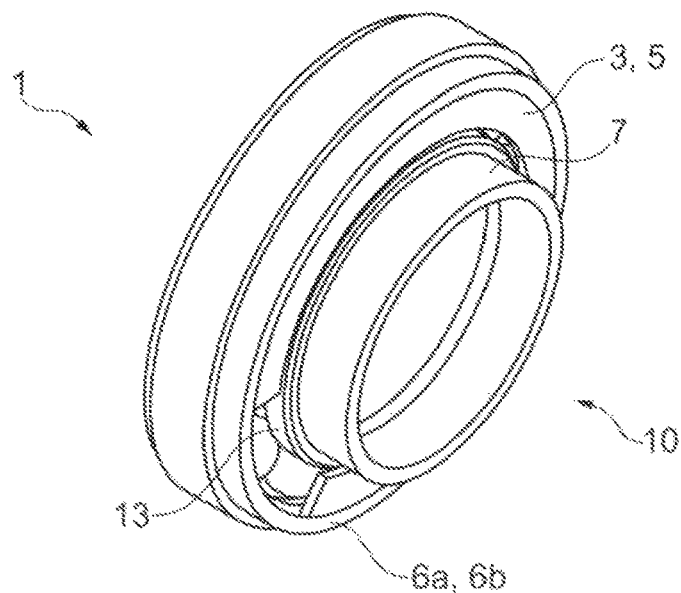

According to this first embodiment of the invention, a first electrically insulating layer 5 is formed directly on at least one surface section 3 of the roller bearing 1. In FIG. 3, a roller bearing 1 is shown in perspective view. The surface section 3 of the roller bearing 1 is here, for example, a metallic sealing washer 3 on which the first electrically insulating layer 5 is deposited in at least one section. As further shown in FIG. 1, a first electrically conductive layer 7 that forms multiple conductor paths 9 with contact positions 11 for the electrical contacting of electrical components 6a, 6b is provided over the first electrically insulating layer 5. The first electrically insulating layer 5 is preferably formed by a powder coating on the surface section 3. The first electrically conductive layer 7 is then formed by means of an electrochemical metallization on the first electrically insulating layer 5.

The construction and connections of the electrical components 6a, 6b are realized according to a method known from the prior art for mounting components on surfaces.

Figure 2:
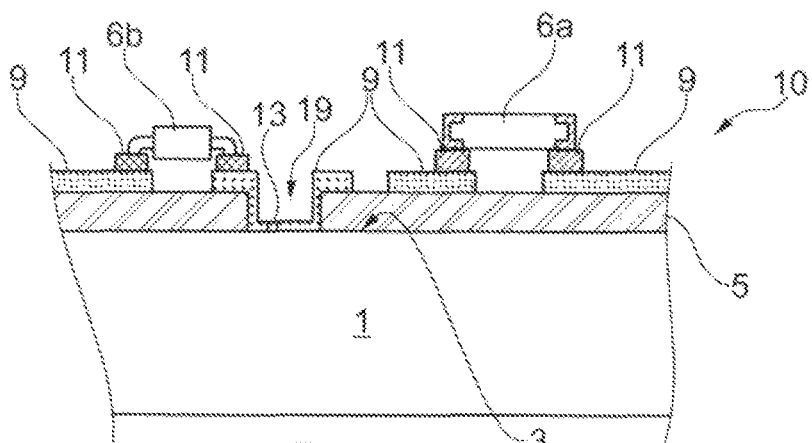

FIG. 2 shows a schematic side view of a part of the roller bearing 1 with another embodiment of an electrical circuit 10 connected to the roller bearing 1.

Preferably, the first electrically insulating layer 5 is structured here at a position 19 up to the surface section 3 of the roller bearing 1. At this position 19, an electrical contact element 13 is formed, so that the electrically conductive layer 7 is connected in an electrically conductive way to the roller bearing 1. It is further shown here that the electrical circuit 10 has as electrical components preferably both passive electrical components 6a and also electronic components 6b at the contact positions 11 of the conductor paths 9.

FIG. 3 shows a perspective view of an electrical circuit 10 produced on a surface section 3 of the roller bearing 1 which has already been described with respect to FIG. 1. To be noted here, however, is that also the opposite surface section 3 of the sealing washer of the roller bearing 1 can also be formed with an electrical circuit 10.

Figure 4:
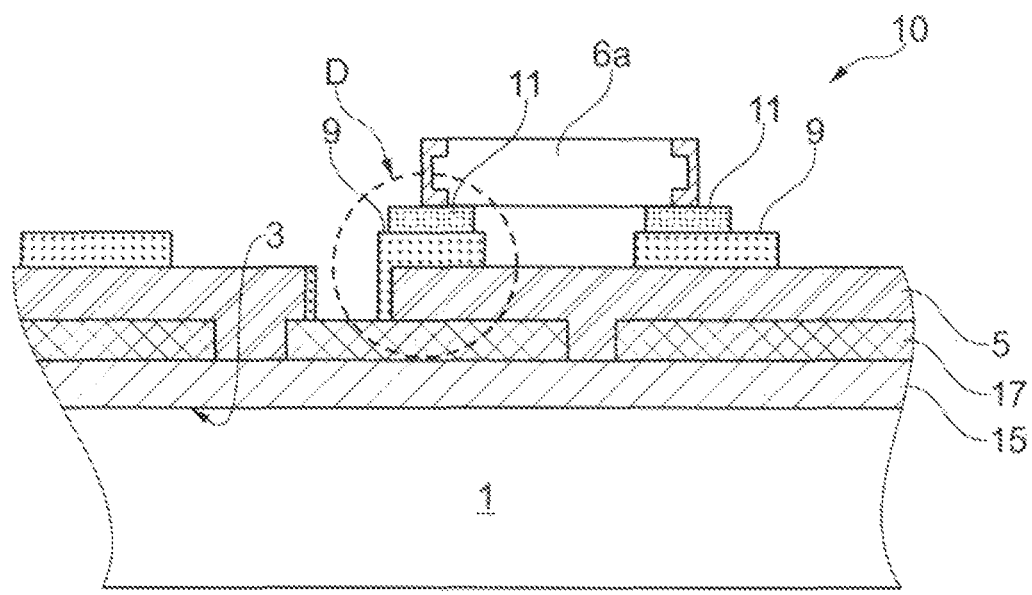

FIG. 4 shows a schematic side view of a part of the roller bearing 1 with another embodiment of an electrical circuit 10 connected to the roller bearing 1.

According to this embodiment, a second electrically insulating layer 15 is formed directly on the at least one surface section 3 of the roller bearing 1. The second electrically insulating layer 15 here carries a second electrically conductive and structured layer 17 on which the first electrically insulating layer 5 and the first electrically conductive layer 7 with the conductor paths 9 and the contact positions 11 are formed.

Through this embodiment, it is guaranteed that the second electrically insulating layer 15 takes over a protective function of the second electrically conductive and structured layer 17 with respect to particles and fluids.

Figure 5:
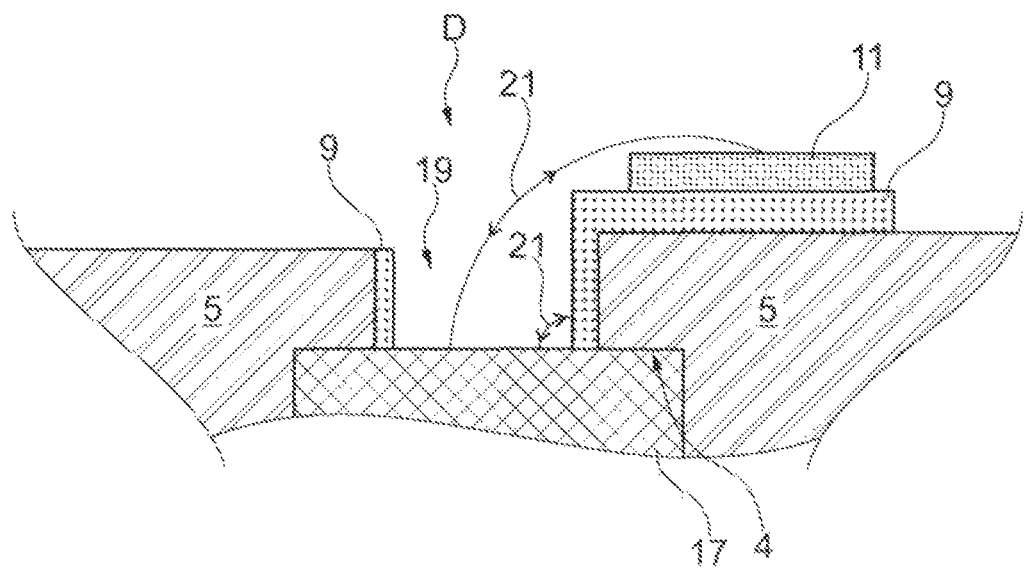

FIG. 5 shows an enlarged detail section of the area marked with D in FIG. 4.

As shown here, the first electrically insulating layer 5 is structured at a position 19 up to a surface section 4 of the second electrically conductive layer 17. At this position 19, two electrical contacts 21 are provided that connect the second electrically conductive layer 17 to an electrical conductor path 9 and a contact position 11 of the first conductive layer 7.

List of Reference Numbers

1 Rolling bearing
3 Surface section of the rolling bearing
4 Surface section of the second electrically conductive layer
5 First electrically insulating layer
6a Passive electrical component 6b Electronic component
7 First electrically conductive layer
9 Conductor path
10 Circuit
11 Contact position
13 Contacting element
15 Second electrically insulating layer
17 Second electrically conductive and structured layer
19 First position of the electrically insulating layer
21 Electrical contacting

The invention claimed is:

1. A rolling bearing with an electrical circuit, comprising:
a first electrically insulating layer,
a second electrically insulating layer deposited directly on at least one surface section of the rolling bearing,
a first electrically conductive layer provided over the first electrically insulating layer, the first electrically conductive layer including conductor paths with contact positions adapted for electrical contacting of electrical components, and
a second electrically conductive layer, the second electrically conductive layer being structured and supported on the second electrically insulating layer, and the first electrically insulating layer and the first electrically conductive layer are deposited on the second electrically conductive layer.

2. The rolling bearing according to claim 1, further comprising at least one of passive electrical components or passive electronic components.

3. The rolling bearing according to claim 1, wherein the first electrically insulating layer is structured in at least one position up to a surface section of the second electrically conductive layer and at least one electrical contact is provided that connects the second electrically conductive layer to at least one of the conductor paths or the contact positions of the first electrically conductive layer.

4. A production method for an electrical circuit on at least one surface section of a rolling bearing, the method comprising:
depositing a base electrically insulating layer on which a base electrically conductive and structured layer is provided on at least one surface section of a rolling bearing;
forming a top electrically insulating layer on the at least one surface section of the rolling bearing;
forming a top electrically conductive layer on the top electrically insulating layer;
structuring the top electrically conductive layer, so that conductor paths are formed in the top electrically conductive layer;
forming contact positions on the conductor paths.

5. The production method according to claim 4, wherein the top electrically insulating layer and the top electrically conductive layer are deposited by an electrostatic powder coating.

6. The production method according to claim 4, wherein the top electrically insulating layer is structured in at least one position up to a surface section of the base electrically conductive layer, so that at least one electrical contact is provided, through which the base electrically conductive layer is connected to at least one of the conductor paths or the contact positions of the top electrically conductive layer.

7. The production method according to claim 4, further comprising mounting at least one of passive electrical components or passive electronic components over the contact positions of the conductor paths of the top electrically conductive layer.

* * * * *